H. A. SCHROEDER.
HOSE CLAMP.
APPLICATION FILED JUNE 22, 1921.
1,432,572. Patented Oct. 17, 1922.
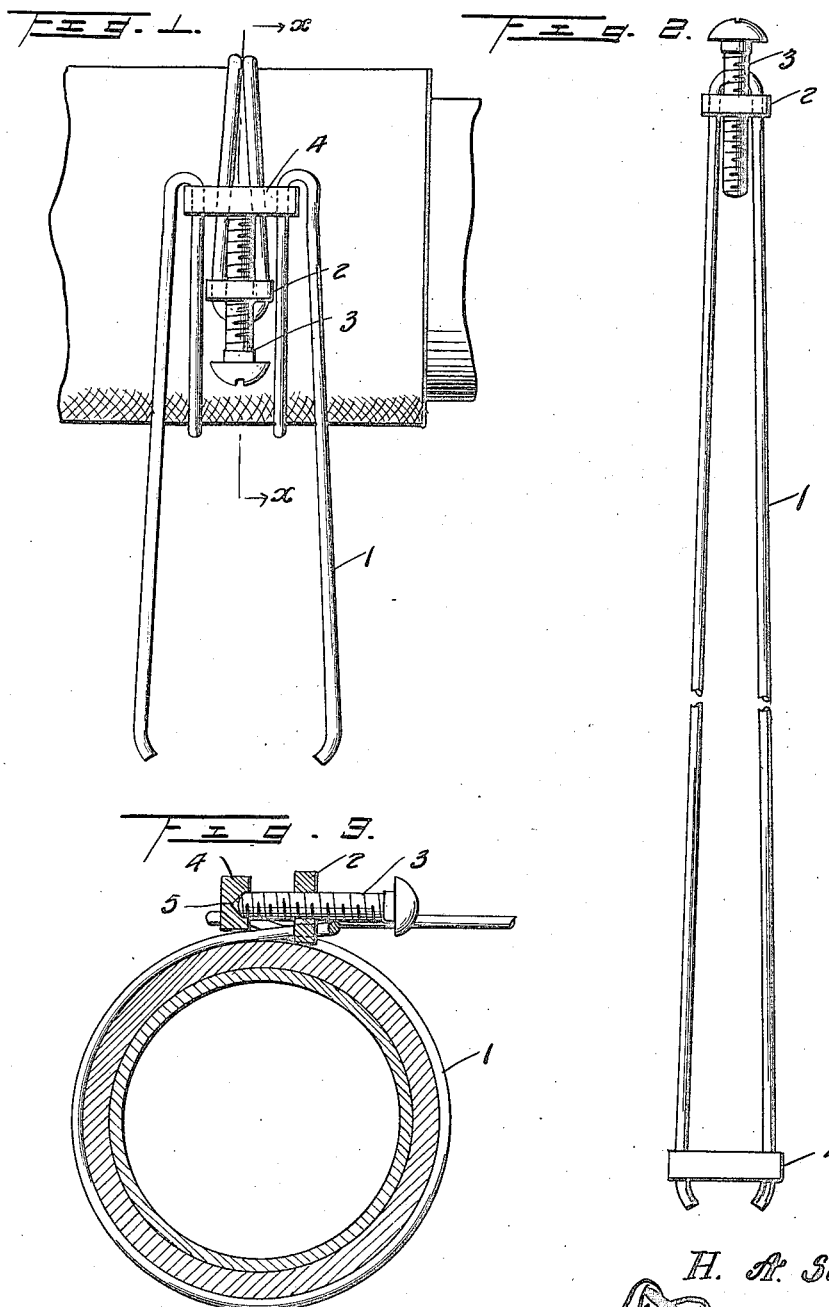

Patented Oct. 17, 1922.

1,432,572

UNITED STATES PATENT OFFICE.

HENRY A. SCHROEDER, OF CHICAGO, ILLINOIS.

HOSE CLAMP.

Application filed June 22, 1921. Serial No. 479,547.

*To all whom it may concern:*

Be it known that I, HENRY A. SCHROEDER, a citizen of the United States, residing at Chicago, in the county of Cook and State of Illinois, have invented certain new and useful Improvements in Hose Clamps; and I do hereby declare the following to be a full, clear, and exact description of the invention, such as will enable others skilled in the art to which it appertains to make and use the same.

The invention aims to provide a clamp for the hose connections of radiators of cooling systems of internal combustion engines utilizing water as the cooling agent which will completely encircle the hose and which is readily adjustable to the required size and which is free from loose parts which are liable to become detached and lost.

The clamp consists of a wire connector doubled upon itself, a nut in the bight of the wire and receiving a screw and an abutment adjustable on the opposite end of the connector and adapted to be secured in the adjusted position by bending the end portions of the wire.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a top plan view of a hose clamp illustrative of the invention showing the same applied.

Figure 2 is a view of the clamp extended, and

Figure 3 is a sectional detail on the line *x—x* of Figure 1.

Corresponding and like parts are referred to in the following description and designated in the several views of the drawing by like reference characters.

A hose clamp constructed in accordance with the present invention consists of a length of wire 1 of suitable gage and size doubled upon itself and having a nut 2 in the bight of the connector thus formed. A screw 3 is fitted to the nut 2 and the latter has openings near one edge upon opposite sides of the threaded openings to receive the end portions of the wire 1. An abutment 4 is adjustable upon the opposite end portion of the connector and has openings in opposite end portions adjacent a longitudinal edge thereof to receive the end portions of the wire connector. The abutment 4 is provided with a depression 5 to receive the end of the screw 3 whereby to prevent slipping of the parts and insure their proper position. The wire connector may be of any determinate length for the larger size hose since the clamp may be readily adjusted and adapted for a smaller size hose by moving the abutment 4 and securing the same in the adjusted position by extending the projecting end portions of the wire so as to engage about the end portion of the abutment as indicated most clearly in Figure 1. The clamp when adjusted to a particular size of hose is adapted to have its end portions overlapped as indicated most clearly in Figure 1 whereby a tightening of the screw 3 tends to separate the parts 2 and 4 and draw the connector about the hose in a manner to clamp the same. By having the end portions of the wire connector overlapped, a space at the joint is prevented and the necessity for a bridge piece is obviated. By having the openings in the parts 2 and 4 adjacent an edge thereof, the overlapping end portions of the connector practically engage the hose so as to confine the same and prevent any bulge at the joint.

When the clamp is properly positioned, the abutment 4 overlies the folded end of the connector and the nut 2 is disposed between the ends of the wire adjacent the abutment 4. Displacement of the parts is prevented by the end of the screw 3 entering the depression 5 of the abutment 4. The abutment 4 preferably consists of a metal block which may be formed in any manner and which is elongated so as to properly space the ends of the wire to receive the nut 2 between them at the joint.

Having thus described the invention, what I claim is:—

1. A hose clamp consisting of a wire doubled upon itself, a nut carried by and secured in the bight of the wire a screw carried by the nut, and an abutment adjustable upon the end portions of the wire.

2. A hose clamp consisting of a wire doubled upon itself, a nut carried by and secured in the bight of the wire a screw carried by the nut, and an abutment adjustable upon the end portions of the wire, and having openings in opposite end portions adjacent the inner edge thereof for the reception of the folded ends of the wire.

3. A hose clamp consisting of a wire doubled upon itself, a nut having openings adjacent an edge thereof and upon opposite sides of the threaded opening and disposed in the bight of the wire and receiving the end portions thereof in said openings, a screw carried by the nut and an abutment having openings in opposite end portions adjacent its inner edge to receive the folded ends of the wire and secured in the required adjusted position by bending the projecting ends of the wire, said abutment having a recess to receive the end of the screw whereby to hold the parts in determinate position against possible displacement.

4. A hose clamp comprising a member doubled upon itself to provide a bight and end portions, a nut connected to the bight, a screw in the nut, an abutment engaged by the screw, said abutment being adjustable upon said end portions by bending said end portions upon themselves at different points along their lengths.

In testimony whereof I affix my signature in presence of two witnesses.

HENRY A. SCHROEDER.

Witnesses:
EDWARD J. KLEIN,
PHILIP F. RSYEKE.